(No Model.)
C. H. ROSS.
LUGGAGE CARRIER FOR BICYCLES.
No. 343,549. Patented June 8, 1886.
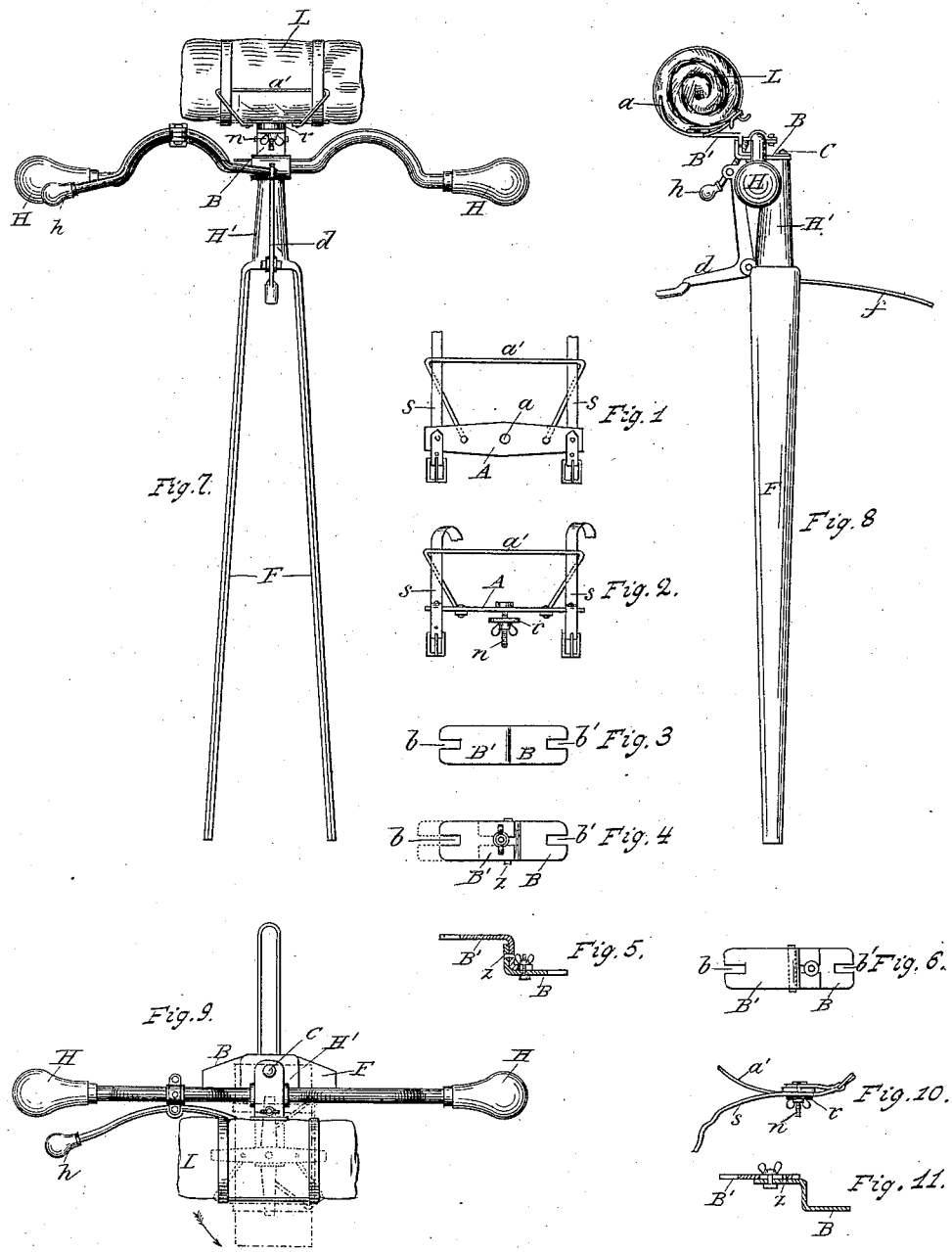
Witnesses:
Fred. Harris
David S. Saxe
Inventor,
Charles H. Ross
by B. I. Stanton, Atty.

UNITED STATES PATENT OFFICE.

CHARLES H. ROSS, OF ALBANY, NEW YORK.

LUGGAGE-CARRIER FOR BICYCLES.

SPECIFICATION forming part of Letters Patent No. 343,549, dated June 8, 1886.

Application filed March 18, 1886. Serial No. 195,691. (No model.)

*To all whom it may concern:*

Be it known that I, CHARLES H. ROSS, a citizen of the United States, residing at Albany, in the county of Albany and State of New York, have invented new and useful Improvements in Luggage-Carriers for Bicycles, of which the following is a specification.

My invention relates to a revolving luggage or bundle carrier for a bicycle, to be mounted thereon from the head or handle-bar.

It also relates to a luggage-carrier in which the bundle or luggage frame or holder revolves upon its support or bracket, for the purpose of readily disposing of the luggage relatively to the head of the machine.

It also relates to a luggage-carrier mounted adjustably from the bicycle head or handle-bar, and also to a carrier of detachable and adjustable parts.

It also relates to methods of mounting a revolving luggage-carrier upon a bicycle by means of a support or bracket, which may be lengthened or shortened at will.

It also relates to the locking of the parts.

These objects I attain by means of the construction shown in the accompanying drawings, which form part of this specification, and in which the same letters of reference indicate corresponding parts in all the figures.

Figure 1 is a top view of the luggage or bundle frame provided with straps to bind the luggage thereto. Fig. 2 is a view of the luggage-frame from the rear, showing extension-guard a'. Fig. 3 is the frame-support, which may be straight or curved. Figs. 4, 5, 6, 10 and 11, are top and side views of modifications of the support or bracket in detachable and adjustable parts. Fig. 7 shows front of bicycle-fork, head, handle-bar, and brake, and luggage-carrier mounted on the head. Fig. 8 shows side view of same parts and carrier; Fig. 9, top view in outline of the carrier mounted on the bicycle-head, showing relative position of the luggage and carrier; in dotted line, when the carrier has been revolved.

As shown in the drawings, the appliance consists of a suitable frame, Fig. 1, adapted to revolve upon a bed-plate, bracket, or support, Fig. 3, by means of a pivot through the support and frame-plate A, to which I attach tie-straps $s\ s$, and upon which, firmly fastened thereto, or movable thereon, or detachable, suitable extension-pieces or guards are mounted, to form a carriage or frame for the luggage. These bent pieces are curved upward from the frame-plate A, as shown, Figs. 10 and 7, and the tie-straps are conveniently passed or woven through it in securing the luggage to the frame. Through $a$, I pivot the frame-plate to the support B at $b$, so that the frame may be rotated on the support. I construct this support or bracket straight, curved, or double-angled in its length, but rigid in cross-section, and provide a hole, or preferably a slot, in the forward end, and pass a pivot or bolt through the frame-plate to act in the slot, so that the frame may be mounted pivotally upon the support adjustably, at different points thereon, and be firmly held thereto at such points by tightening the nut on the bolt $n$, Fig. 2. By this structure, also, the frame can be readily detached from its support by the rider while upon the saddle. I construct the other end of the support B suitably for mounting it upon the bicycle head or handle-bar. I mount the support preferably upon the head of the machine, holding it firmly in place between a check-nut, C, and the head, and for this purpose I provide a slot in the rear end of the support, so that the lugs thus formed on this end may pass between the head and check-nut without interfering with the set-screw in the head, which engages the backbone of the bicycle, and be firmly clamped to the head by the nut. This end of the support may be forked or lengthened and bent over the handle-bar or along the sides of the head, and there secured, or may be secured to the hand-bar or to the head by a clutch or other obvious and equivalent means. The support B B' may be double-angled or bent along its length, so that in projecting forward it shall clear the brake or other attachments upon the bicycle, and also to allow the luggage-frame to rotate without interfering with its support or the other parts of the bicycle. The support may also be bent forward, so that the frame may rotate in a plane angled to the horizontal as well as in a horizontal plane, so that the luggage may be suspended in a convenient manner relatively to the structural arrangement of the machine upon which the carrier is to be mounted. The support is constructed preferably, also, in sections, Figs. 4, 5, 6, 11, so that the part B of the support may remain secured to the bicycle, and the part B' may be readily removed, together with the frame, so as not to interfere with the movements of the rider, and these parts may be locked together adjustably. In this construction the sections of the support may be straight, or curved, or angled, and locked together by a bolt or screw. I provide the sections with suitable holes or slots, through which the locking-bolt acts, whereby the sections may be adjusted longitudinally to lengthen or shorten the support, and to adjust the plane of rotation of the carrier-frame. When the support is constructed in sections, I provide one or both sections with clips $z$, to engage the other section to prevent slipping or rotation of one section upon the other at the joint.

Between the carrier-plate A and the support B B', at the pivotal point I mount suitable washers, of rubber, $r$, Fig. 2, to prevent the pivot mechanism from loosening by the rotation of the frame. By this construction the luggage-frame can be firmly screwed to the support and be maintained in position at right angles thereto, Fig. 7, or it may be rotated to a different position, and be there maintained automatically locked in the desired position.

In riding a bicycle it is convenient and often necessary, particularly in coasting, for the rider to project his legs forward over the handle-bar and hang them over the head of the machine. Obviously this would be dangerous to attempt and difficult to accomplish when a bundle is suspended above or in front of the handle-bar and parallel therewith. By this construction the rider from his saddle can readily rotate the carrier with the luggage thereon so that the bundle shall occupy a position angled to the handle-bar, Fig. 9, (dotted line,) not only rendering it safe to suspend his legs over the handle-bar, but also affording a brace for the rider to prevent him from sliding forward in his saddle in coasting. Obviously, also, the rider, without leaving his seat, can adjust the length of the support, in order to suspend the luggage more over the head of the machine, or forward from the head, or to regulate the support relatively to the size of the bundle to be carried. Obviously, also, when the support is constructed of separable parts, and bent or curved along its length suitably if the support be lengthened, its front end will be protruded forward and downward, so as not to interfere with the brake or other attachments of the bicycle, but so as to suspend the luggage adjustably in front of the handles. The plates of the frame and support are preferably of metal, and the tie-straps are attached to the frame-plate by a rivet or other equivalent means.

The above-described improvements enable the luggage-carrier to be compactly made in all its parts and to be operated from the saddle. It also gives the operating parts efficiency and economy of construction. It permits the luggage to be disposed in different positions relatively to the head of the machine at will, and to be rotated and held self-locked in such position. It permits the carrier to be readily removed, taken apart, and packed in very small compass.

Obviously the frame may be mounted pivotally on the bicycle by means of a frame and support differing in construction from the support and frame herein shown without departing from the spirit of my invention; but the method of construction and of operation and the advantages of my invention will be obvious without further explanation.

I claim as my invention—

1. In combination with a bicycle, the suspensory bracket B B' and a bundle-frame mounted pivotally on the free end of said support.

2. In a bundle-carrier for a bicycle, the combination of a bicycle head or handle-bar and a supporting strap or clip rigidly attached at one end to said head or handle, and a revolving bundle-frame mounted on the free or unattached end of said strap or clip.

3. A support for a bicycle bundle-carrier, with means of attaching the same to a bicycle or velocipede, in combination with a rotating bundle frame or plate mounted on the free or suspended end of said support and adjustable therewith longitudinally 4. In an attachment for a bicycle or other similar vehicle, the combination of a slotted clip or plate, B B', with mechanism for attaching the same to the bicycle, and the plate A, upon which to support a load, mounted pivotally on the plate B B' and operating therewith independently of the means of attachment of the same to the bicycle.

5. In a bicycle luggage-carrier, a supporting-bracket for the holder-frame mounted on the bicycle head or handle-bar, and consisting of detachable sections adjustable longitudinally, with stops for maintaining the support as adjusted rigid in cross-section.

6. In a luggage-carrier for a bicycle, a suitable frame to hold the load mounted pivotally and adjustably and self-locking on a sectional and longitudinally-adjustable support or brackets, by means of which the frame is attached to the bicycle head or handle-bar.

7. In combination with a bicycle head or handle-bar, the support B B' and the bundle-frame revolving thereon, consisting of the plate A, with tie-straps $s$ $s$ and extension-guards, substantially as described.

8. In combination with a bicycle head or handle-bar, the frame for holding the luggage mounted pivotally on a connecting support or arms consisting of adjustable locking-sections, essentially as described.

9. The combination of a frame-plate, A, and its tie-straps and guards to hold luggage, mounted pivotally by an adjustable stop on a slotted adjustable support or bracket, B B', by means of which it is mounted on a bicycle head or handle.

10. In a bicycle luggage-carrier, the carrier-frame mounted pivotally on a sectional or divided support whose sections are engaged and locked together adjustably by stops, so that the plane of rotation of the carrier-frame may be horizontal or angled, and the pivotal point adjusted relatively toward or from the bicycle-head.

11. In a luggage-carrier for a bicycle, the combination of a divided support whose sections are bent correlatively and locked together adjustably to be rigid in cross-section, whereby the frame or holder for luggage may be suspended at any desired distance in front of the head or handle bar, with a frame or holder mounted on said support.

12. The frame described for a bicycle bundle-carrier, having plate A, tie-straps $s\ s$, and guard and pivot locking mechanism $n\ r$, and detachable support, substantially as described, and means of attachment to a bicycle.

CHARLES H. ROSS.

Witnesses:
DAVID S. SAXE,
FREDK. HARRIS.